United States Patent
Akizuki

[19]

[11] Patent Number: 6,126,121

[45] Date of Patent: Oct. 3, 2000

[54] BINDING TOOL

[75] Inventor: Hideaki Akizuki, Nagoya, Japan

[73] Assignee: Kitagawa Industries Co., Ltd., Nagoya, Japan

[21] Appl. No.: 09/379,999

[22] Filed: Aug. 24, 1999

[30] Foreign Application Priority Data

Aug. 31, 1998 [JP] Japan .................................. 10-245627

[51] Int. Cl.$^7$ .................................................. F16L 3/22
[52] U.S. Cl. ............................................................ 248/68.1
[58] Field of Search ................................. 248/68.1, 74.4, 248/74.1, 65, 72, 49

[56] References Cited

U.S. PATENT DOCUMENTS

| | | | |
|---|---|---|---|
| 4,395,009 | 7/1983 | Bormke | 248/68.1 |
| 5,150,865 | 9/1992 | Miller | 248/74.1 X |
| 5,622,341 | 4/1997 | Stana | 248/74.1 |

FOREIGN PATENT DOCUMENTS 39-10936  4/1964  Japan .

*Primary Examiner*—Ramon O. Ramirez
*Attorney, Agent, or Firm*—Davis and Bujold

[57] ABSTRACT

A binding tool which provides good operability at the time of binding and unbinding a bundle of cables and which can be easily secured even in a narrow space, without a risk that a part thereof might be lost. A binding stay (2) has a bottom portion (11), two arm portions (12a, 12b), sawtooth-like notches (23) and a tightener support portion (26). A tightener (3) has a clamping plate (31b), for clamping the bundle of cables against the bottom portion (11), and two engaging projections (35a, 35b), for engagement with the sawtooth-like notches (23), respectively. A disengaging portion, which has a supporting plate (31b), two pressing protrusions (33a, 33b), and two connecting portions (32a, 32b), disengages each of the engaging projections from the sawtooth-like notches. A flange portion (24) in the tightener support portion (26) engages the pressing protrusion (33a) as well as an engaging protrusion (34a) in the clamping plate (31b), thereby preventing the clamping plate (31b) from being separated from the arm portion (12a) when the clamping plate (31b) is rotated about each protrusion (33a, 34a).

3 Claims, 11 Drawing Sheets

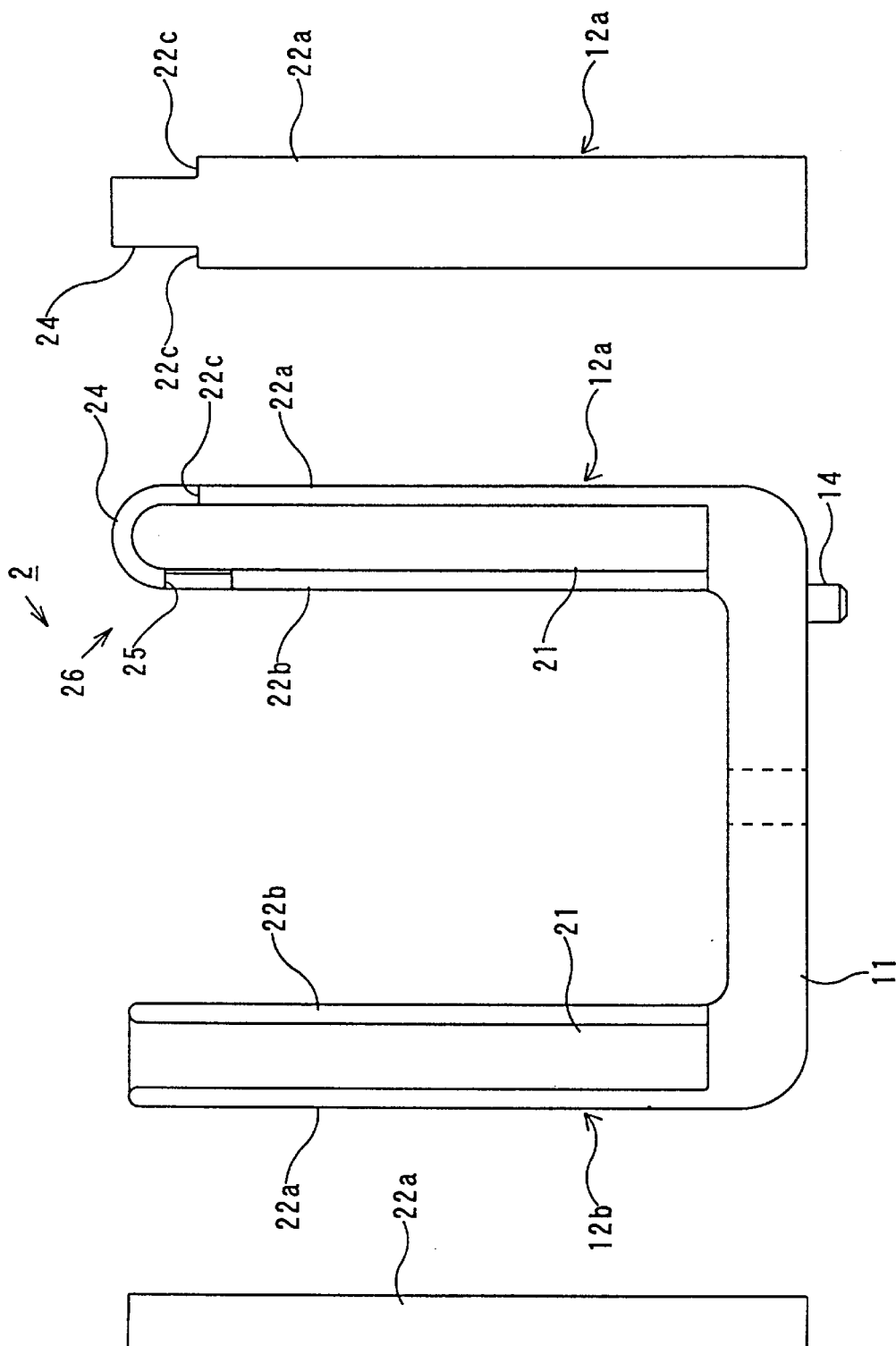

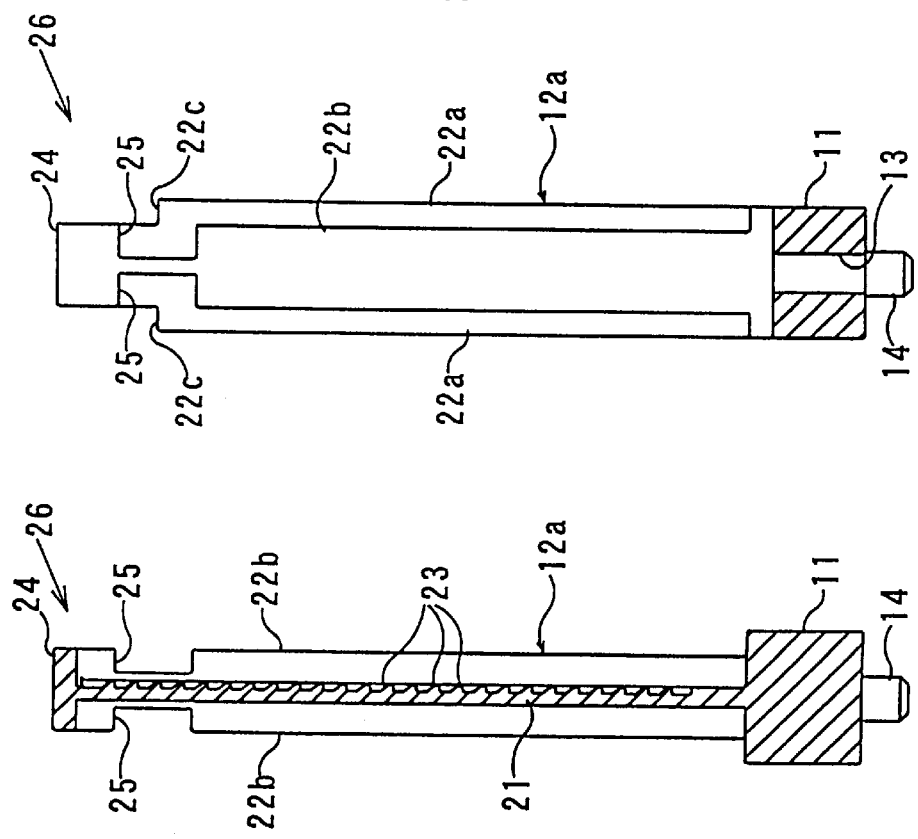

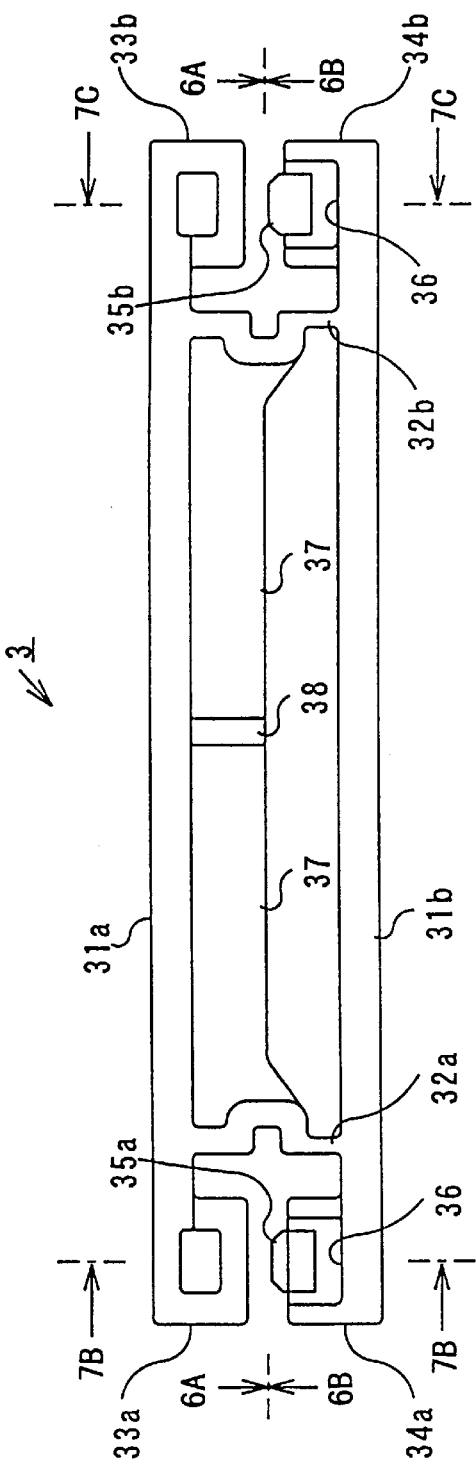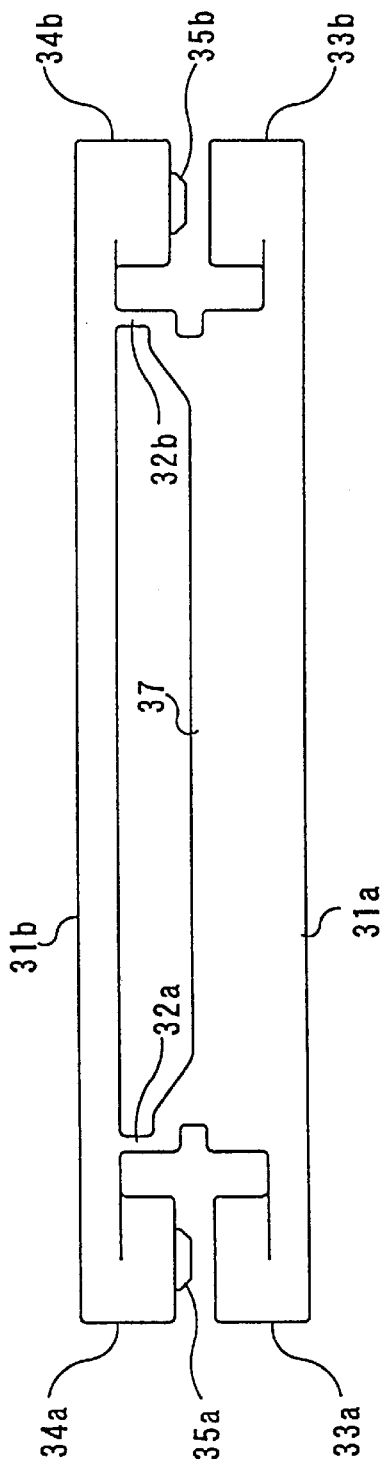
FIG. 5A
FIG. 5B

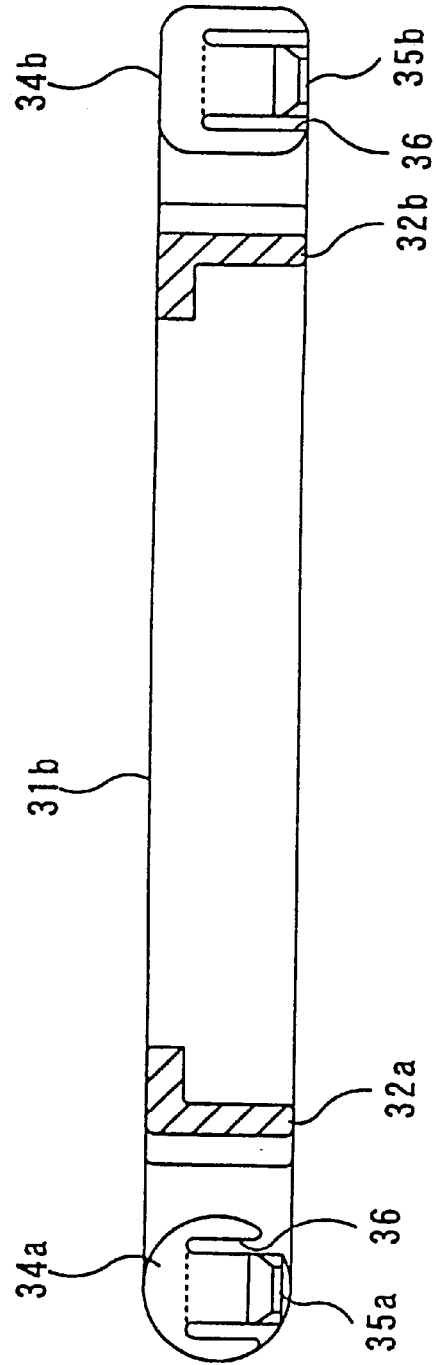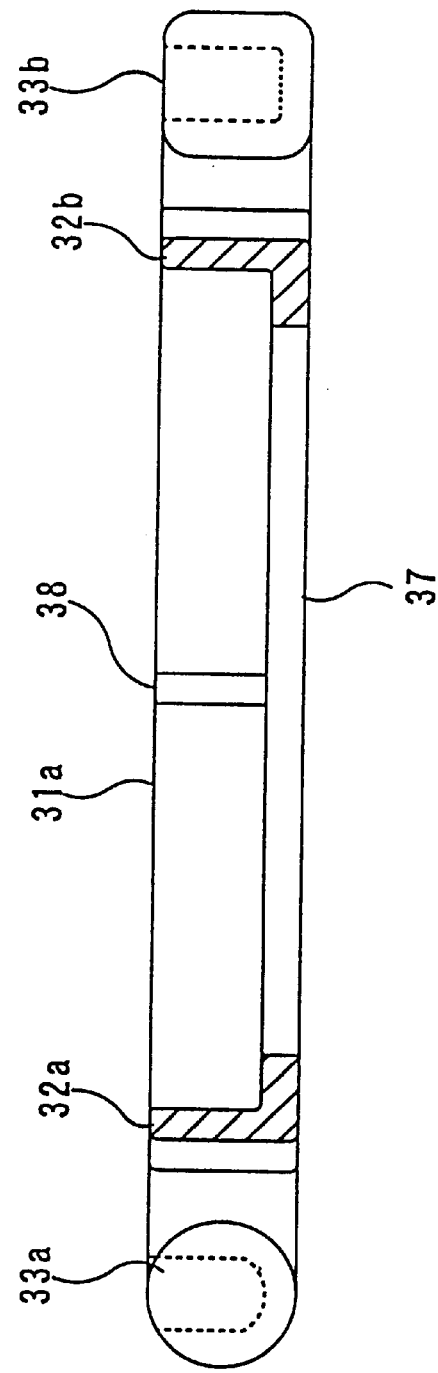

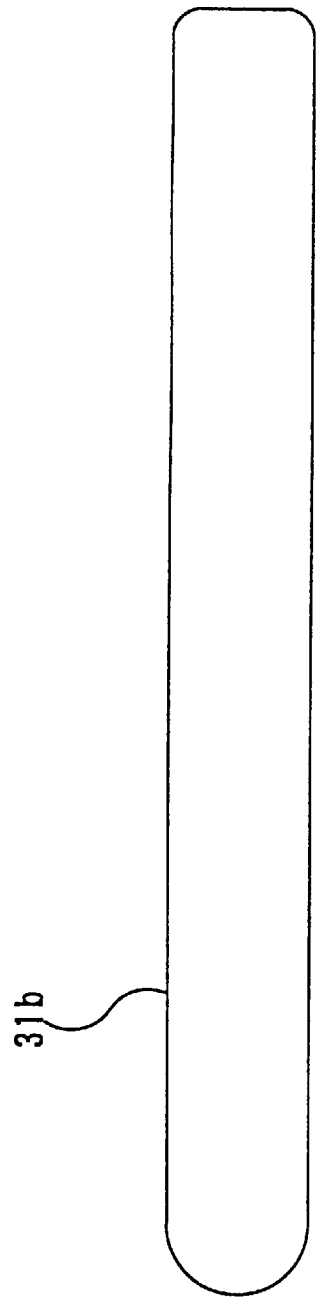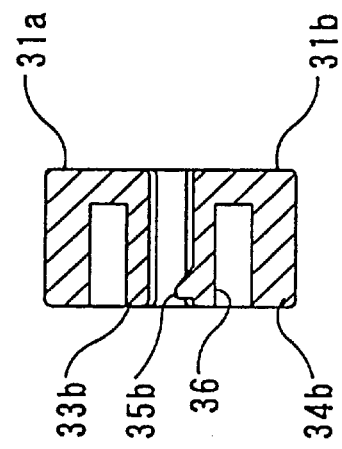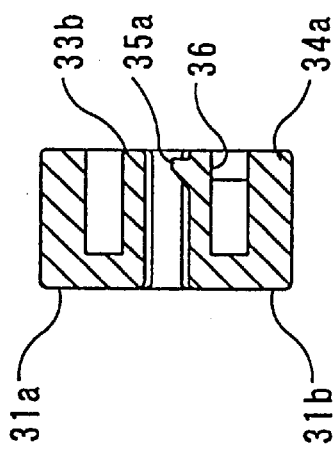

BINDING TOOL

FIELD OF THE INVENTION

This invention relates to a cable binding tool, more specifically, a binding tool for binding a bundle of cables for mounting the bundle.

BACKGROUND OF THE INVENTION

FIG. 11 is a perspective view of a conventional binding tool for binding and mounting a bundle of cables.

A binding tool 101 comprises a binding stay 102 and a tightener 103, which are respectively made of an elastically recoverable plastic material.

The binding stay 102 comprises a bottom portion 104 and two arm portions 105 extending from both ends of the bottom portion 104 vertically and in parallel with each other. The bottom portion 104 and the arm portions 105 make a U-shaped structure. A securing hole 106 is formed at the central part of the bottom portion 104. Sawtooth-like notches 107 are formed on the opposed outside faces of the arm portions 105.

Two engaging holes 108 are located in the tightener 103 which is in the shape of a flat plate. The engaging holes 108 are inserted over the arm portions 105 and resiliently engage the sawtooth-like notches 107.

In order to use such a binding tool 101, the bottom portion 104 is first secured, with a bolt or screw inserted into the securing hole 106, to position on a body to be secured to (not shown), such as a chassis, panel and a stay of a cable distributor rack. The binding tool 101 is thus secured to the body.

Subsequently, a bundle of cables to be bound (not shown) is set on the inside of a U shape and the arm portions 105 are inserted into the engaging holes 108 of the tightener 103. In this state, each arm portion 105 extends vertically from the bottom portion 104 and the engaging holes 108 resiliently engage the sawtooth-like notches 107 to hold the tightener 103 at any notch defined position on the arm portions 105. Consequently, by adjusting the stop position of the tightener 103 relative to the arm portions 105, the bundle of cables is pressed and gripped between the inside of the U shape of the binding stay 102 and the lower face of the tightener 103. When the thickness of the bundle of cables is within a predetermined range (that is, the number of the cables is within a predetermined range), the bundle of cables can be bound and fixed without fail.

When the bundle of cables is to be unbound and released from the binding tool 101, the arm portions 105 are removed from the engaging holes 108 of the tightener 103 by carrying out the aforementioned operation in reverse order.

In this way, by using the binding tool 101, the number of cables to be bound and fixed can be increased or decreased simply and easily.

However, the conventional binding tool 101 has the following problems.

Firstly, when a bundle of cables to be bound is set on the inside of the U shape of the binding stay 102, it is necessary for the tightener 103 to be separated from each arm portion 105. There is accordingly a risk of losing the separated tightener 103 during the operation.

Secondly, the resilient force of each arm portion 105 vertical to the opposed face is set at such a degree that the sawtooth-like notches 107 and the inside face of each engaging hole 108 are securely engaged with each other, the tightener 103 is stopped at any position on each arm portion 105 and is not moved easily. Accordingly, when each engaging hole 108 of the tightener 103 is inserted over or removed from each arm portion 105, it is necessary for an operator to pinch and move the tightener 103 with one hand, while the resilient force is released by pinching and bending inwardly the arm portions 105 with the other hand. Therefore, both hands must be used during the binding and unbinding operations for the bundle of cables, which makes operability poor. The operability is heavily aggravated, especially, when the binding tool 101 is secured in a narrow space.

Thirdly, when each engaging hole 108 of the tightener 103 is inserted over each arm portion 105, both ends of the tightener 103 protrude from both opposed outside faces of the arm portions 105. Therefore, when the binding tool 101 is secured to a body, enough spaces should be kept in both end areas of the tightener 103 for its protrusion from the opposed outside faces of the arm portions 105, and it is thus difficult to secure the binding tool 101 in a narrow space.

SUMMARY OF THE INVENTION

This invention was made to solve the aforementioned problems. The object of the invention is to provide a binding tool which provides good operability at the time of binding and unbinding a bundle of cables, and which can be easily secured even in a narrow space, without a risk that a part thereof might be lost.

The object of the invention is attained in the invention by providing a binding tool for binding and attaching a bundle of cables having a binding stay and a tightener, wherein the binding stay comprises:

a bottom portion to support the bundle of cables;

first and second arm portions extending parallel to each other from opposed ends of the bottom portion;

first and second sawtooth-like notches formed on a side of each of the first and second arm portions, respectively; and a tightener support portion provided at the upper end of the first arm portion to allow rotation of the tightener when engaged therewith, the tightener comprises:

a clamping plate bridged between the first and second arm portions, for clamping the bundle of cables against the bottom portion;

first and second engaging projections provided at opposed ends of the clamping plate to engage the first and second sawtooth-like notches, respectively; and a disengaging portion for disengaging the first engaging projection from the first sawtooth-like notches as well as the second engaging projection from the second sawtooth-like notches by releasing the engagement of the engaging projections from the first and second sawtooth-like notches; wherein the tightener support portion is engaged with one end of the clamping plate to prevent the clamping plate from being separated from the first arm portion when the clamping plate is rotated about the one end.

In this structure, a bundle of cables is bound and clamped between the bottom portion of the binding stay and the clamping plate of the tightener by setting the bundle of cables on the bottom portion and pushing the tightener down toward the bottom portion. The tightener is fixed to each arm portion by engagement between the sawtooth-like notches and each engaging projection. In order to unbind and release the bundle of cables, the pressing force applied from the clamping plate to the sawtooth-like notches is released by the disengaging portion, thereby disengaging each engaging projection from the sawtooth-like notches.

BRIEF DESCRIPTION OF THE DRAWINGS

A binding tool according to this invention will now be described, by way of example, with reference to the accompanying drawings, in which:

FIGS. 3 (a), (b), and (c) are a right side view, a rear view, and a left side view, respectively, of the binding stay of FIG. 2;

FIGS. 4 (a), (b), (c), and (d) are sectional views taken along line 4A—4A, line 4B—4B, line 4C—4C, and line 4D—4D, respectively, in FIG. 2 (c);

FIGS. 5 (a) and (b) are a plan view and a bottom view, respectively, of a tightener of the binding tool of FIG. 1;

FIGS. 6 (a) and (b) are sectional views taken along line 6A—6A and line 6B—6B, respectively, in FIG. 5 (a);

FIG. 7 (a) is a front view of the tightener, and FIGS. 7 (b) and (c) are sectional views taken along line 7B—7B and line 7C—7C, respectively, in FIG. 5 (a);

DESCRIPTION OF THE PREFERRED EMBODIMENTS

Figure 2A:
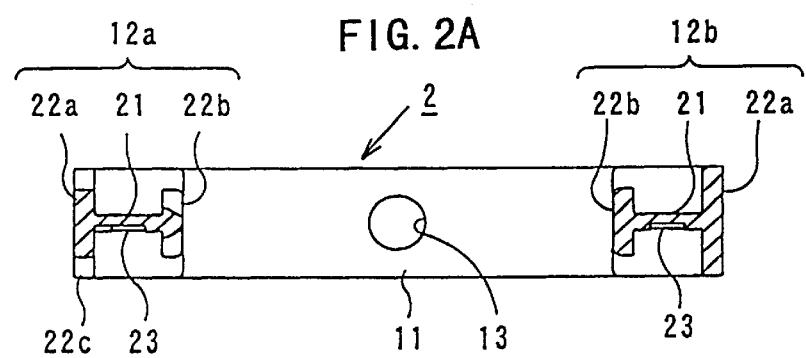
FIG. 2 (a) is a sectional view taken along line 2A—2A in FIG. 2 (c), and FIGS. 2 (b) and (c) are a plan view and a front view, respectively, of a binding stay of the binding tool of FIG. 1.
Figure 2B:
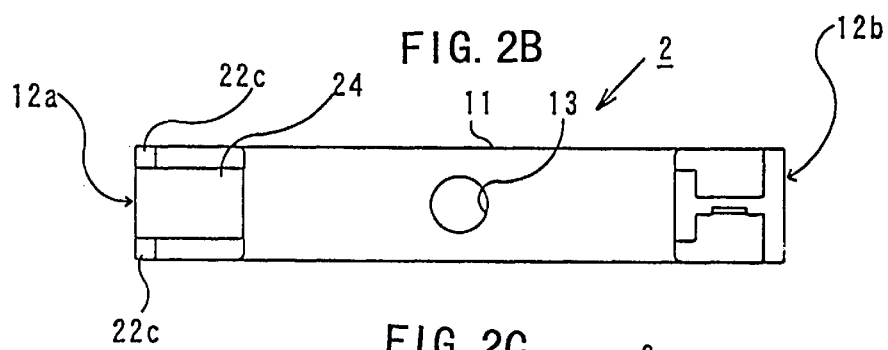
Figure 2C:
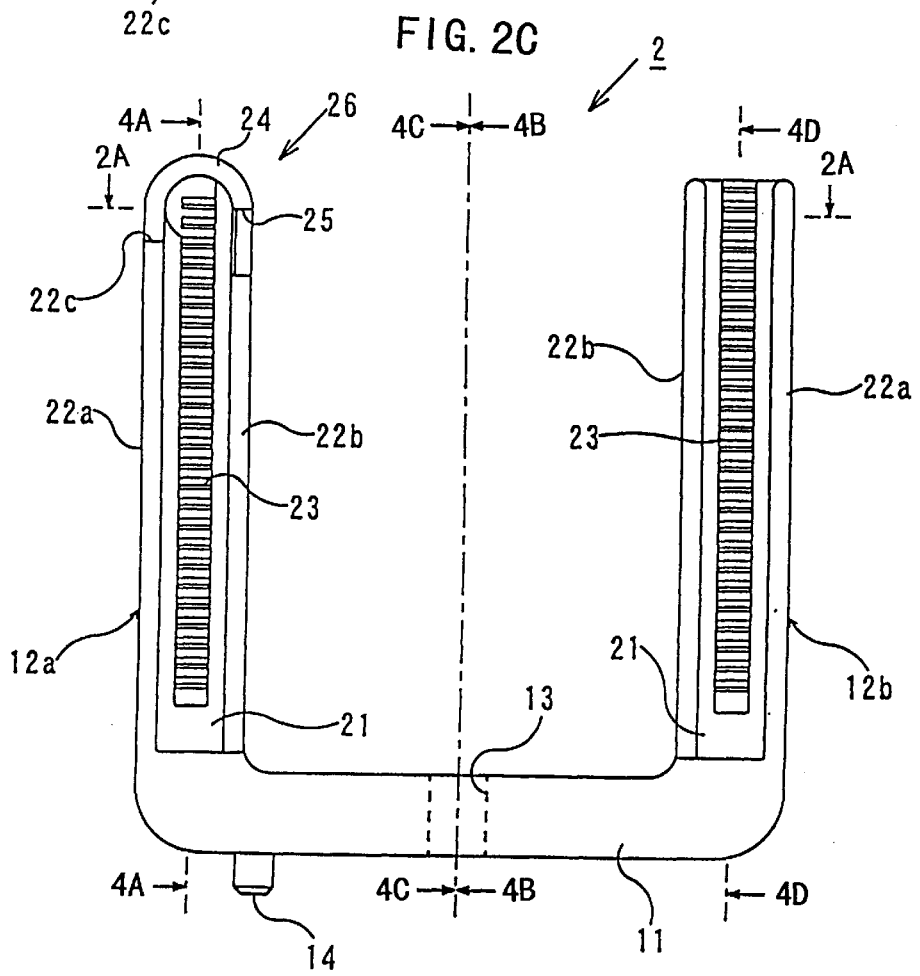

As shown in the drawings, a binding tool 1 according to this invention comprises a binding stay 2 and a tightener 3. As shown in FIGS. 2 to 4, the binding stay 2 comprises a bottom portion 11 and arm portions 12a and 12b and is integrally formed by injection molding a plastic material (such as polypropylene resin and nylon resin).

Two arm portions 12a and 12b, having H-shaped cross-sections, extend vertically and in parallel with each other from opposite ends of the bottom portion 11 which has a square cross-section. The bottom portion 11 and the arm portions 12a and 12b make a U-shaped structure.

A securing hole 13 is formed at the central part of the bottom portion 11 and a cylindrical locating protrusion 14 is provided on the lower face of the bottom portion 11 toward the arm portion 12a.

Each of the arm portions 12a and 12b having an H-shaped cross-section comprises a web 21, parallel to front and back of the binding tool 1, and flange portions 22a and 22b provided vertically from both ends of the web 21. In this case, the width of the flange portion 22b provided on the inside of the web 21 is narrower than that of the flange portion 22a provided on the outside of the web 21. Sawtooth-like notches 23 are formed on the front face of the web 21 extending toward the front face of the binding tool 1.

The upper end of the web 21 of the arm portion 12a is formed in a semi-circular shape, and a flange portion 24 extends laterally from the upper end of the web 21. As a result, the flange portion 24 also has a semi-circular shape surrounding the upper end of the web 21. Also, the flange portion 24 is formed equally in width to the flange portion 22b. One end of the flange portion 24 is contiguous with the flange portion 22a. A flange notch 25, where no flange is formed, is provided between the other end of the flange portion 24 and the upper end of the flange portion 22b. Furthermore, a stop 22c is formed by a part of the flange portion 22a which protrudes from both sides of the flange portion 24.

A tightener support portion 26 for a tightener 3 is composed of the semi-circular upper end of the web 21, the flange portion 24, and the flange notch 25.

On the other hand, no flange is provided at the upper end of the web 21 in the arm portion 12b. The upper end of the arm portion 12b is formed as an H shape by the web 21 and each of the flange portions 22a and 22b.

As shown in FIGS. 5 to 7, the tightener 3 comprises a supporting plate 31a, a clamping plate 31b, and connecting portions 32a and 32b and is integrally formed by injection molding a material which is elastically recoverable plastic (such as polypropylene resin and nylon resin).

A cylindrical pressing protrusion 33a is provided at one end of the supporting plate 31a which is in the shape of a flat plate, and a square-pole pressing protrusion 33b is provided at the other end thereof. The top face of each of the pressing protrusions 33a and 33b is flat.

A cylindrical engaging protrusion 34a is provided at one end of the clamping plate 31b in the shape of a flat plate, and a square-pole engaging protrusion 34b is provided at the other end thereof. Engaging projections 35a and 35b are provided on the top faces of the engaging protrusions 34a and 34b, respectively. A recess 36 is formed surrounding both sides as well as the rear of each of the engaging projections 35a and 35b in the engaging protrusions 34a and 34b, respectively.

The supporting plate 31a and the clamping plate 31b are disposed opposite to each other. The top face of the pressing protrusion 33a and that of the engaging protrusion 34a are disposed in parallel and opposite to each other. The top face of the pressing protrusion 33b and that of the engaging protrusion 34b are also disposed in parallel and opposite to each other.

The respective roots of the pressing protrusion 33a and the engaging protrusion 34a are connected by the connecting portion 32a. Also, the respective roots of the pressing protrusion 33b and the engaging protrusion 34b are connected by the connecting portion 32b.

A disengaging portion is composed of the clamping plate 31b, the pressing protrusions 33a and 33b, and the connecting portions 32a and 32b.

Provided between the connecting portions 32a and 32b on the lower face side of the supporting plate 31a is a flange portion 37 for reinforcing the supporting plate 31a. Further provided from the central part of the flange portion 37 to the inside of the supporting plate 31a is a bridge 38 for reinforcement.

The use of the binding tool 1 having the aforementioned structure will now be described with reference to FIG. 1 and FIGS. 8 to 10.

First of all, the tightener 3 is coupled with the binding stay 2. More specifically, as shown by arrow α in FIGS. 8 (a) and 9, the pressing protrusion 33a and the engaging protrusion 34a of the tightener 3 are inserted, through the flange notch 25 provided in the arm portion 12a of the binding stay 2, into the end portion of the web 21 in the arm portion 12a.

Figure 8A:
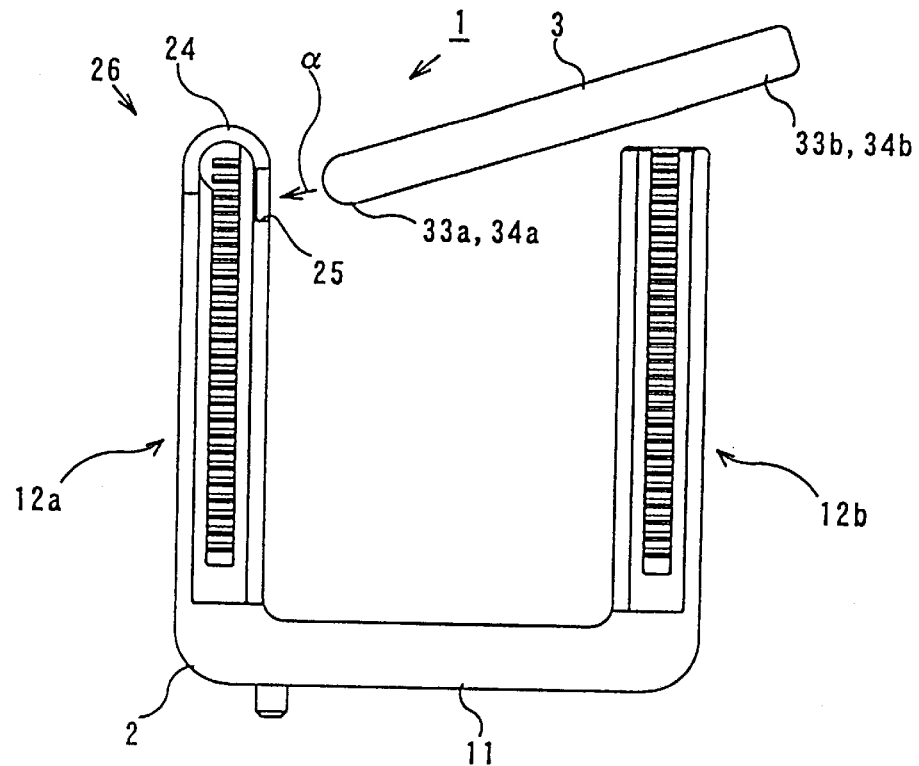
FIG. 8 is a front view illustrating the method of use of the binding tool of FIG. 1.
Figure 8B:
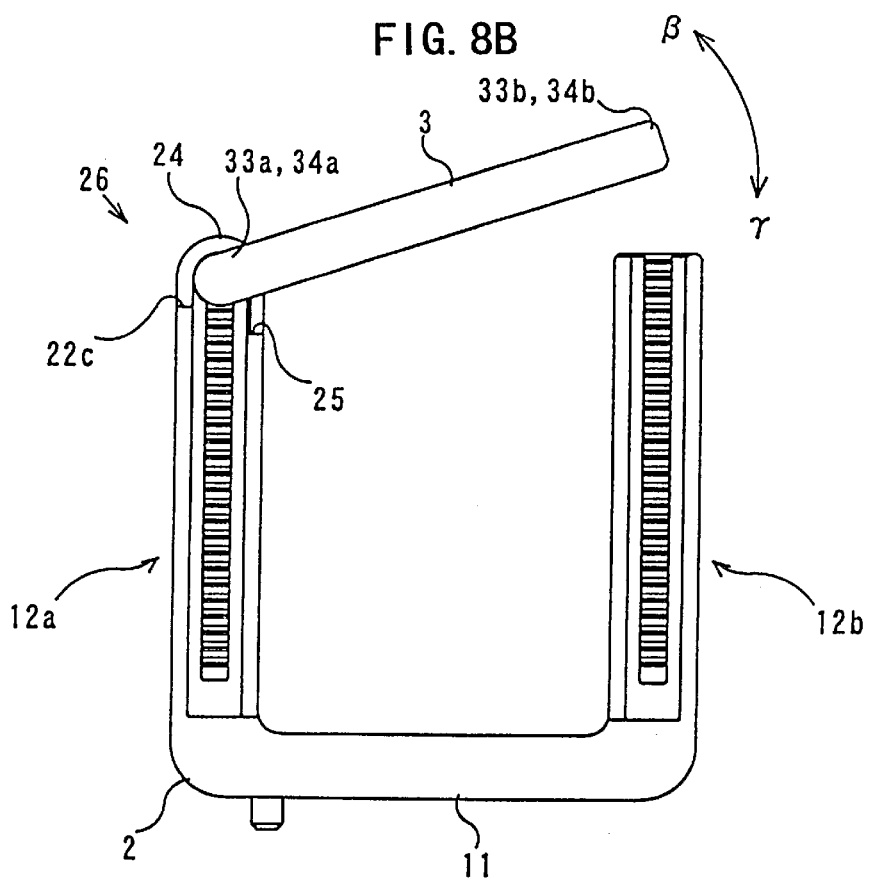
Figure 9:
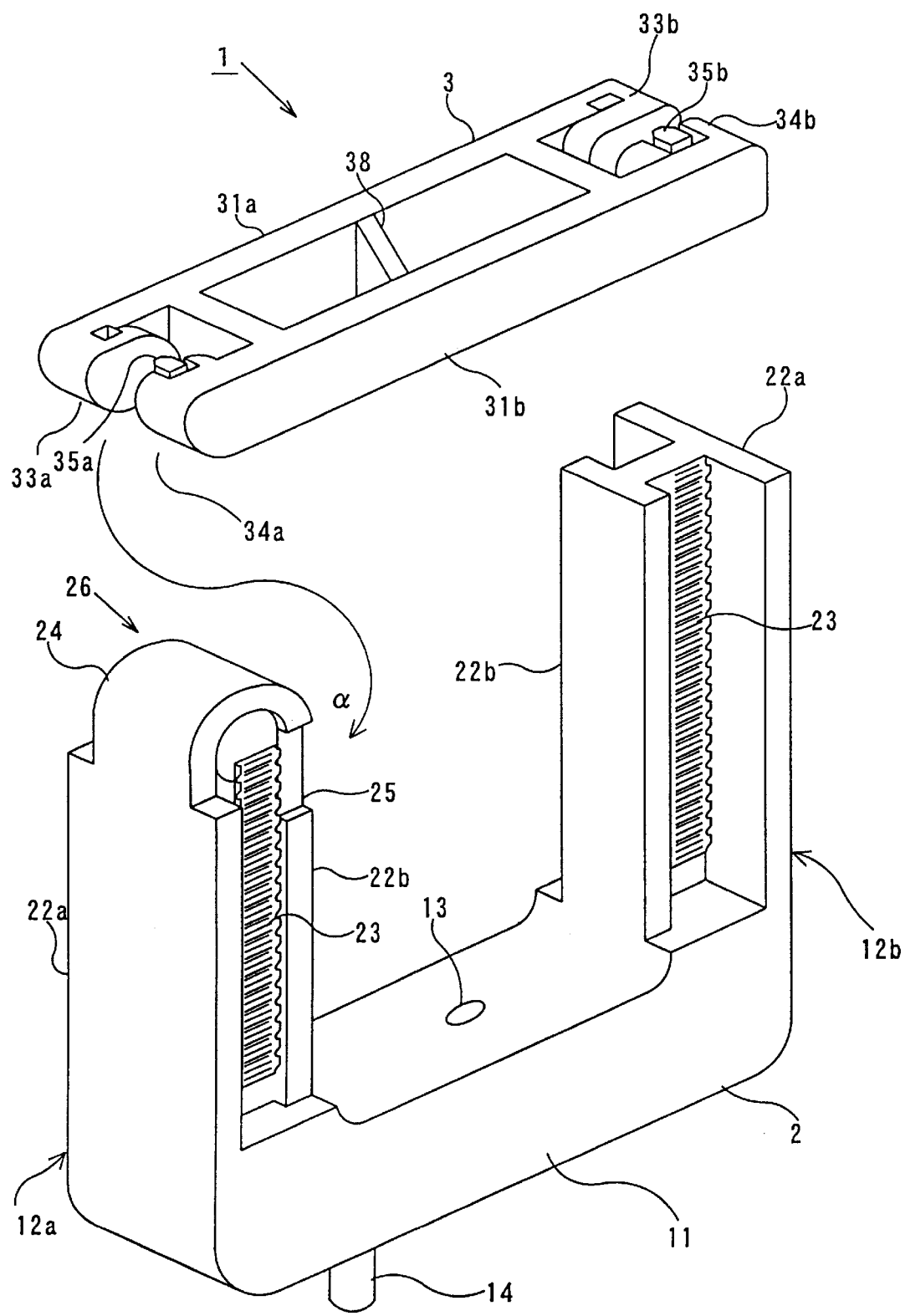
FIG. 9 is a perspective view illustrating the method of use of the binding tool of FIG. 1.
Figure 10:
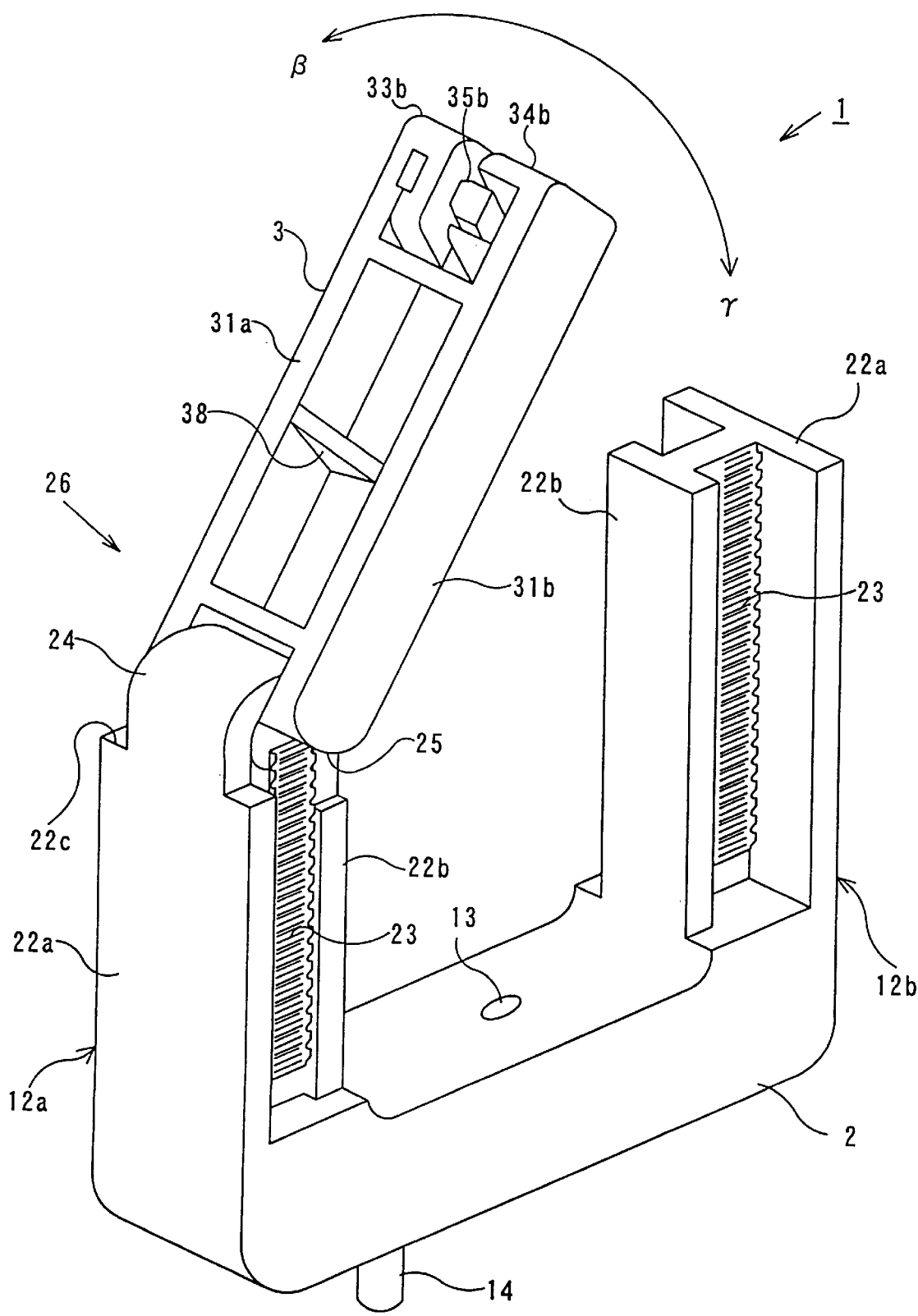
FIG. 10 is a perspective view illustrating the method of use of the binding tool of FIG. 1.
Figure 11:
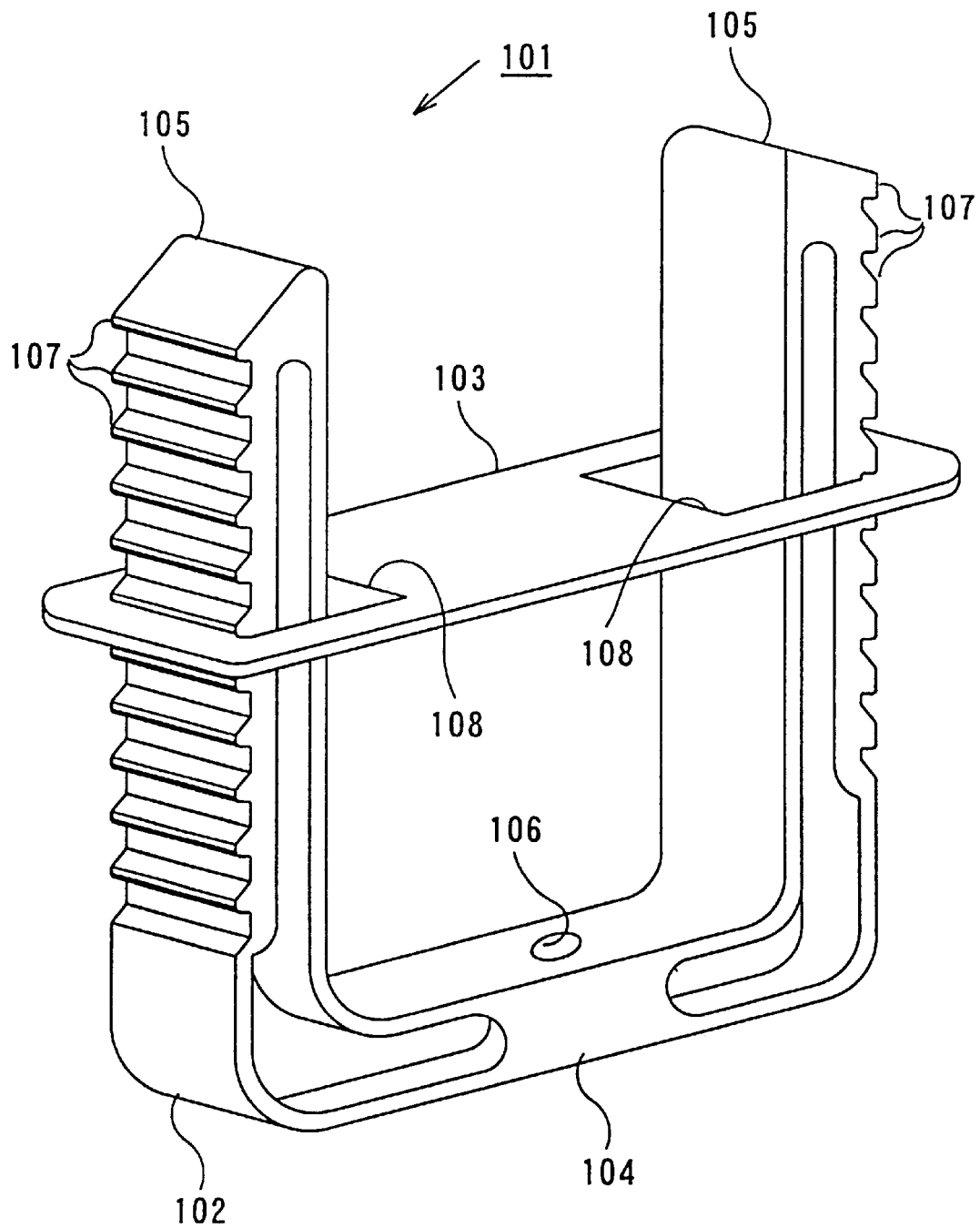
FIG. 11 a perspective view of a conventional binding tool.

Consequently, as shown in FIGS. 8 (b) and 10, the cylindrical pressing protrusion 33a and engaging protrusion 34a are engaged with the semi-circular flange portion 24. Under this state, when the side of the pressing protrusion 33b and engaging protrusion 34b of the tightener 3 are moved in the directions as shown by arrows β and γ, the respective outer circumferential faces of the protrusions 33a and 34a are slid along the inner circumferential face of the flange portion 24 and the tightener 3 is rotated, relative to the binding stay 2, about each protrusion 33a and 34a. In this case, by making the outer diameter of each of the cylindrical protrusions 33a and 34b a little smaller than the inner diameter of the circular flange portion 24, ease of sliding is increased, thereby allowing the tightener 3 to be rotated more smoothly. In cases where the tightener 3 is rotated at an angle of 180 degrees in a direction as shown by arrow β, an end face of each of the supporting plate 31a and the clamping plate 31b of the tightener 3 is stopped by the stop 22c in the arm portion 12a of the binding stay 2, thereby controlling the rotation of the tightener 3.

The flange portion 24 is surrounding the upper end of the web 21 in the arm portion 12a and the flange notch 25 is formed on the inside of the arm portion 12a. Therefore, in order to disengage the protrusions 33a and 34b from the flange portion 24, the protrusions 33a and 34a must be pushed down and pulled out such that they can pass through the flange notch 25. In other words, once the protrusions 33a and 34a are engaged with the flange portion 24, they are not easily disengaged from the flange portion 24 even when the tightener 3 is rotated.

In this way, by providing the tightener support portion 26, the tightener 3 can be rotatably connected to the binding stay 2 and prevented from being easily detached from the binding stay 2 while being rotated.

As a next step, the bottom portion 11 is secured, with a bolt inserted into the securing hole 13, to a body (not shown), such as a chassis, panel or stay of a cable distributor rack. Here, the locating protrusion 14 is engaged with a hole formed in the body. The binding tool 1 is thus secured to the body with its orientation defined. By this engagement between the locating protrusion 14 and the hole formed in the body, the binding tool 1 is prevented from rotating about the bolt, thereby defining the orientation of the binding tool 1 relative to the body.

Subsequently, a bundle of cables to be bound (not shown) is placed on the inside of the U shape of the binding stay 2 formed by the bottom portion 11 and the arm portions 12a and 12b.

The tightener 3 is then rotated in a direction as shown by arrow γ such that the pressing protrusion 33b and the engaging protrusion 34b of the tightener 3 are inserted into the end portion of the arm portion 12b of the binding stay 2. Since the upper end face of the arm portion 12b is formed in an H shape by the web 21 and the flange portions 22a and 22b, the pressing protrusion 33b and the engaging protrusion 34b can be smoothly introduced into the rear and front faces, respectively, of the web 21 of the arm portion 12b.

Figure 1A:
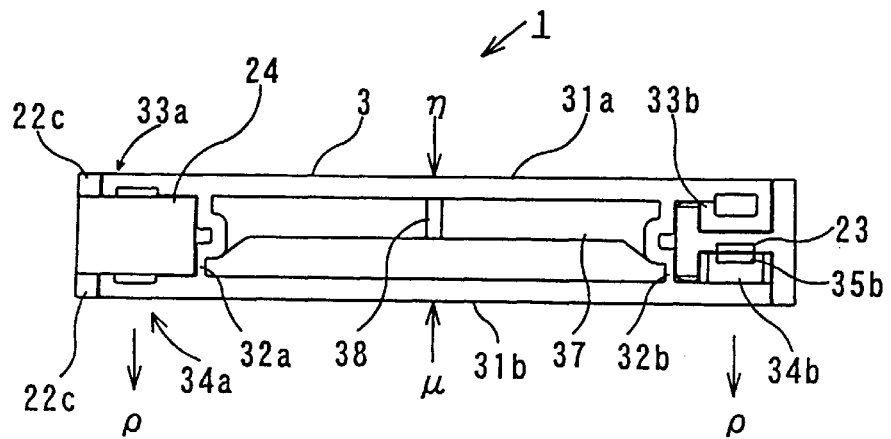
FIGS. 1(a) and (b) are a plan view and a front view, respectively, of a binding tool of the invention.
Figure 1B:
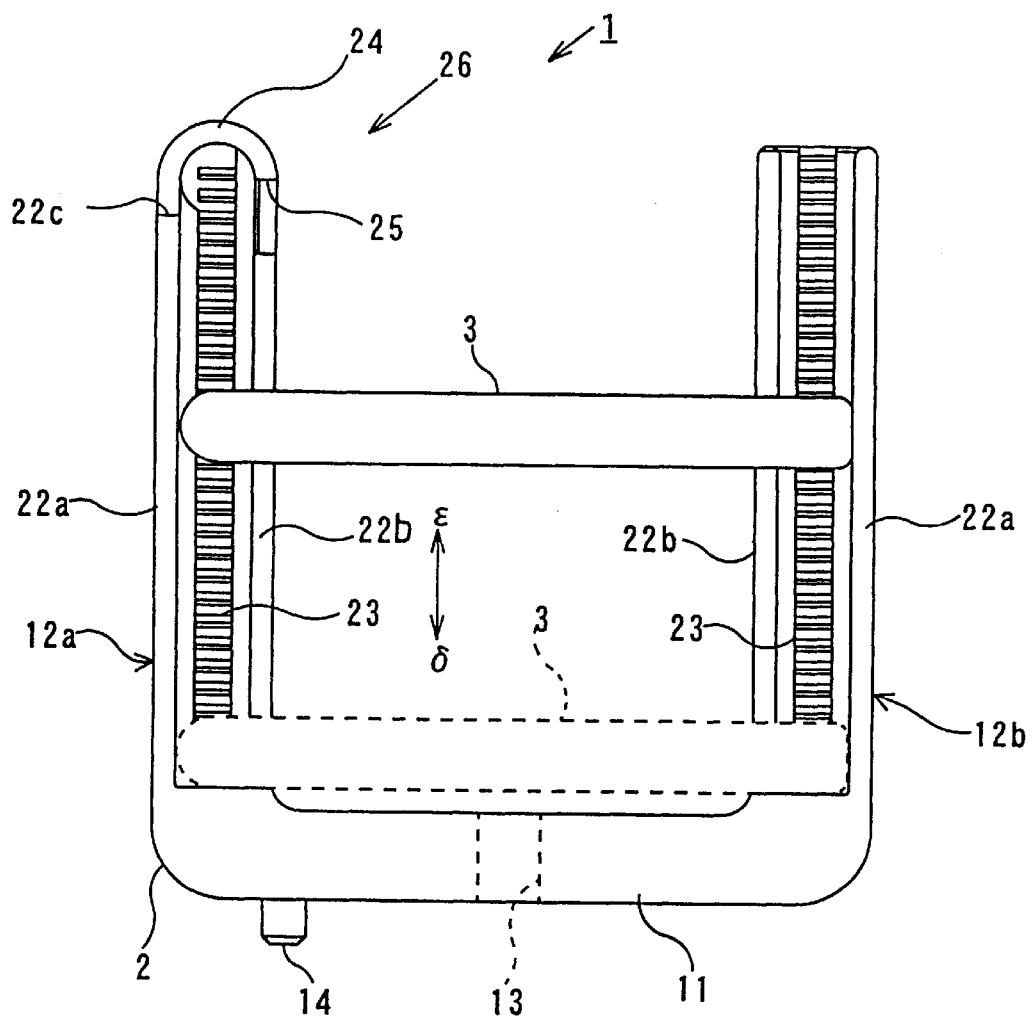

Now, as shown in FIG. 1, the tightener 3 is pushed down, in a direction as shown by arrow δ, toward the bottom portion 11. Consequently, the engaging projection 35a provided on the engaging protrusion 34a of the tightener 3 engages with the sawtooth-like notches 23 of the arm portion 12a. In the same manner, the engaging projection 35b provided on the engaging protrusion 34b of the tightener 3 engages with the sawtooth-like notches 23 of the arm portion 12b. The tightener 3 is thus latched at any desired position on the arm portions 12a and 12b and, by adjusting the stop position of the tightener 3 relative to the arm portions 12a and 12b, the bundle of cables is pressed and gripped by the inside of the U shape of the binding stay 2 and the lower faces of the supporting plate 31a, the clamping plate 31b and the flange portion 37 of the tightener 3. When the thickness of the bundle of cables is within a range of capacity of the inside of the U shape of the binding stay 2, the bundle of cables can be bound and fixed without fail.

In addition to the fact that the tightener 3 is made of an elastically recoverable material, the recess 36 is formed in each of the engaging protrusions 34a and 34b. As a result, the engaging projections 35a and 35b have resilience in a vertical direction relative to the sawtooth-like notches 23 and securely engage with the sawtooth-like notches 23.

The rear faces of the webs 21 of the arm portions 12a and 12b are pressed by the flat top faces of the pressing protrusions 33a and 33b. Therefore, the webs 21 of the arm portions 12a and 12b are pressed and gripped from back and front sides by the engaging projections 35a and 35b as well as the pressing protrusions 33a and 33b, thereby preventing the tightener 3 from wobbling vertically relative to the webs 21.

Furthermore, by making the outer diameters of the cylindrical pressing protrusion 33a and engaging protrusion 34a a little smaller than the width between the flange portions 22a and 22b of the arm portion 12a, the outer circumferential faces of the protrusions 33a and 34a abut on the inside faces of the flange portions 22a and 22b of the arm portion 12a. In the same manner, by making the width in a horizontal direction of the square-pole pressing protrusion 33b and engaging protrusion 34b a little smaller than the width between the flange portions 22a and 22b of the arm portion 12b, the outer circumferenctial faces of the protrusions 33b and 34b abut on the inside faces of the flange portions 22a and 22b of the arm portion 12b with an area corresponding to the width in a vertical direction of the protrusions 33b and 34b. That is to say, both sides of each of the protrusions 33a and 34a are gripped by the flange portions 22a and 22b of the arm portion 12a and both sides of each of the protrusions 33b and 34b are gripped by the flange portions 22a and 22b of the arm portion 12b. The tightener 3 can thus be prevented from wobbling horizontally relative to the webs 21.

Now, when the bundle of cables is to be released from the binding tool 1, the central parts of the supporting plate 31a and the clamping plate 31b of the tightener 3 are pinched and pressed with fingers in the directions as shown by arrows η and μ in FIG. 1.

In this case, force in a direction as shown by arrow μ is applied to the clamping plate 31b and the clamping plate 31b is therefore bent toward the supporting plate 31a. Simultaneously, force in a direction as shown by arrow ρ is applied to the engaging protrusions 34a and 34b, with the connecting parts between the clamping plate 31b and each of the connecting portions 32a and 32b as fulcrums, and, therefore, each of the engaging protrusions 34a and 34b is bent outwardly. Consequently, the engaging projection 35a is disengaged from the sawtooth-like notches 23 of the arm portion 12a as well as the engaging projection 35b is disengaged from the sawtooth-like notches of the arm portion 12b.

Since the supporting plate 31a is provided with the flange portion 37 as well as the bridge 38, the supporting plate 31a does not bend even when force in a direction as shown by arrow η is applied thereto and the pressing protrusions 33a and 33b do not, therefore, bend, either.

With the central parts of the supporting plate 31a and the clamping plate 31b of the tightener 3 pinched and pressed with fingers, the tightener 3 is pulled up along the arm portions 12a and 12b in a direction as shown by arrow ε in FIG. 1. Also, as shown in FIG. 8 (b), with the pressing protrusion 33a and the engaging protrusion 34a of the tightener 3 engaged with the flange portion 24 of the arm portion 12a, the tightener 3 is rotated in a direction as shown by arrow β such that the protrusions 33b and 34b of the tightener 3 are released from the arm portion 12b. As a result, the upper space between the arm portions 12a and 12b is opened, thereby allowing the bundle of cables to be removed therethrough.

As mentioned in detail above, the following effects can be obtained according to the present invention.

Firstly, by provision of the tightener support portion 26, the tightener 3 can be rotatably coupled with the binding stay 2 and prevented from being separated therefrom at the time of rotation. This results in the prevention of the loss of the tightener 3 since it is unnecessary that the tightener 3 be removed from the arm portions 12a and 12b when a bundle of cables to be bound is laid inside the U shape of the binding stay 2.

Secondly, by pulling the pressing protrusion 33a and the engaging protrusion 34a out of the arm portion 12a through the flange notch 25, the tightener 3 can be easily separated from the binding stay 2. This results in flexibility at the time of shipment of the binding tool 1. That is to say, it is optional whether the binding tool 1 is shipped with the tightener 3 coupled with the binding stay 2 or with the tightener 3 separated from the binding stay 2 according to the request of a destination side. In this respect, it is possible to easily meet the demands of customers.

Thirdly, by using the binding tool 1, a series of operations for binding and unbinding a bundle of cables (including an operation of coupling the tightener 3 with the binding stay 2, an operation of binding and fixing the bundle of cables by pushing the tightener 3 down in a direction as shown by arrow δ in FIG. 1, and an operation of removing the bundle of cables by rotating the tightener 3 in a direction as shown by arrow β in FIG. 8 after pulling the tightener 3 up in a direction as shown by arrow ε in FIG. 1) can be performed with only one hand. This results in an improved operability, especially, when the binding tool 1 must be secured in a narrow space.

Fourthly, in the state where the tightener 3 is inserted into the arm portions 12a and 12b, the pressing protrusions 33a, 33b and the engaging protrusions 34a, 34b never protrude to the outsides of the flange portions 22a of the arm portions 12a, 12b, respectively. This results in an easy securing of the binding tool 1 even in a narrow space since no extra spaces are necessary to be kept on the right nor left side of the binding tool 1 at the time of securing the binding tool 1 to a body to be secured to.

Since certain changes may be made in the above described, without departing from the spirit and scope of the invention herein involved, it is intended that all of the subject matter of the above description or shown in the accompanying drawings shall be interpreted merely as examples illustrating the inventive concept herein and shall not be construed as limiting the invention.

Wherefore, I've claim:

1. A binding tool for binding and attaching a bundle of cables having a binding stay and a tightener, wherein said binding stay comprises:

a bottom portion to support the bundle of cables;

first and second arm portions extending parallel to each other from opposed ends of said bottom portion;

first and second sawtooth-like notches formed on a side of each of said first and second arm portions, respectively; and a tightener support portion provided at the upper end of said first arm portion to allow rotation of said tightener when engaged therewith, said tightener comprises:

a clamping plate bridged between said first and second arm portions, for clamping the bundle of cables against said bottom portion;

first and second engaging projections provided at opposed ends of said clamping plate to engage said first and second sawtooth-like notches, respectively; and a disengaging portion for disengaging said first engaging projection from said first sawtooth-like notches as well as said second engaging projection from said second sawtooth-like notches by releasing the engagement of the engaging projections from said first and second sawtooth-like notches; wherein said tightener support portion is engaged with one end of said clamping plate to prevent said clamping plate from being separated from said first arm portion when said clamping plate is rotated about said one end.

2. The binding tool according to claim 1, wherein said tightener support portion is provided with a semi-circular flange portion partially surrounding the upper end of said first arm portion, said clamping plate is provided at its one end with a cylindrical protrusion to engage said flange portion, and said first engaging projection is provided on a face of said protrusion.

3. The binding tool according to claim 2, wherein said disengaging portion comprises:

a supporting plate being opposed to said clamping plate;

a first pressing protrusion provided at one end of said supporting plate, for pressing said first arm portion against said first engaging projection;

a second pressing protrusion provided at end of said supporting plate opposed to said one end of said supporting plate and opposite to said first pressing protrusion, for pressing said second arm portion against said second engaging projection;

a first connecting portion for connecting a root of said first pressing protrusion in said supporting plate with a root of said first engaging projection in said clamping plate; and a second connecting portion for connecting a root of said second pressing protrusion in said supporting plate with a root of said second engaging projection in said clamping plate.

* * * * *